R. L. HUNTER.
CONTINUOUS PRESSURE COOKER.
APPLICATION FILED DEC. 7, 1920.
1,419,139.
Patented June 13, 1922.
2 SHEETS—SHEET 2.
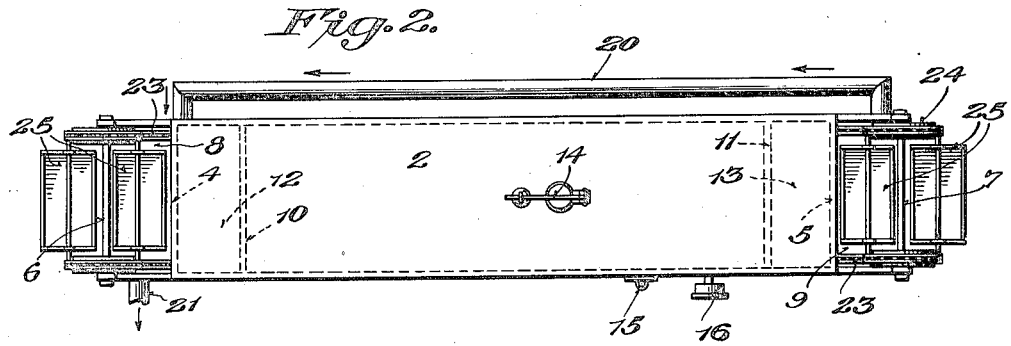
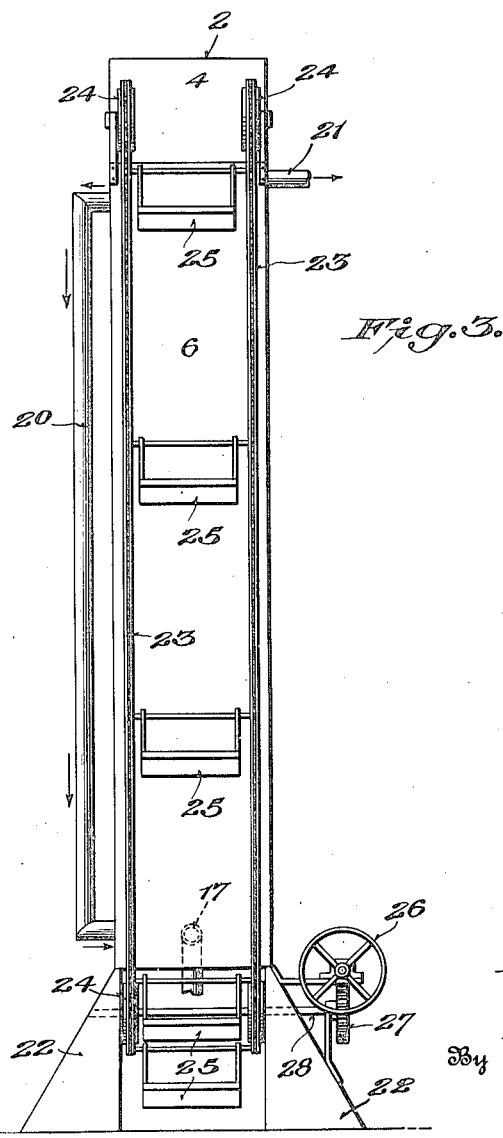
Inventor
Robert L. Hunter,
By Wm. L. Symons
Attorney

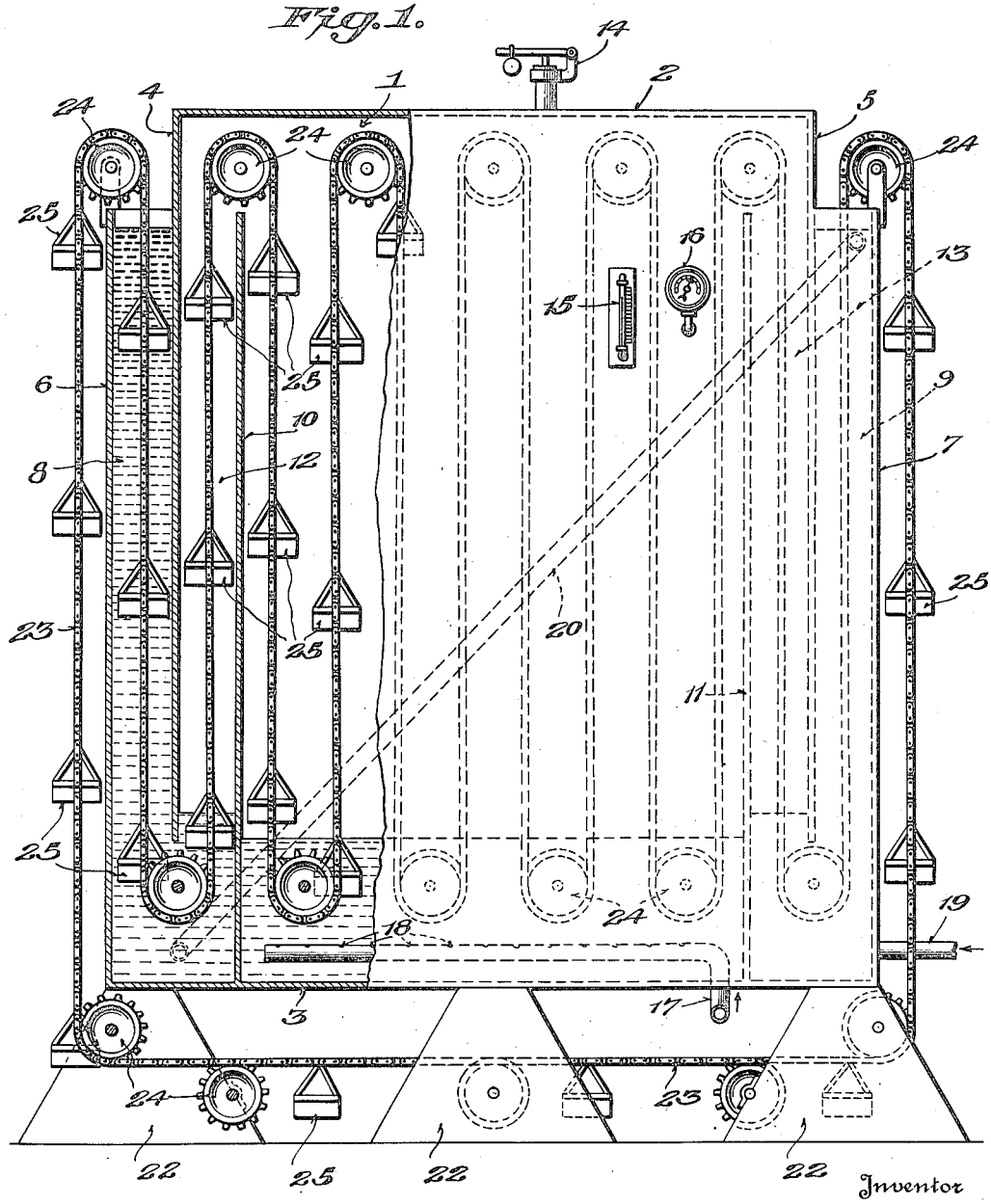

UNITED STATES PATENT OFFICE.

ROBERT L. HUNTER, OF NORFOLK, VIRGINIA.

CONTINUOUS PRESSURE COOKER.

1,419,139.  Specification of Letters Patent.  Patented June 13, 1922.

Application filed December 7, 1920. Serial No. 428,976.

*To all whom it may concern:*

Be it known that I, ROBERT L. HUNTER, a citizen of the United States of America, residing at Norfolk, in the county of Norfolk and State of Virginia, have invented certain new and useful Improvements in Continuous Pressure Cookers, of which the following is a specification.

My invention relates to an improved means for cooking food and to the processes employed therein.

The general objects of my invention are to use the pressure upon a liquid exposed to the air to counterbalance the steam pressure in a cooker; to convey food to be cooked through a liquid to the cooker and out of the cooker through a liquid; to heat the liquid through which the food first passes, after the process has been started, by means of the food as it comes from the cooker; to cool the food as it comes from the cooker; to regulate the temperature of the cooker; and to carry on the cooking process continuously.

Further objects of my invention are to save time and to efficiently use the steam and liquid necessary.

With these and further objects in view, an apparatus for carrying out my invention is illustrated in the accompanying drawings, in which:

Figure 1 is a side elevation of my cooker with a part broken away to show the interior structure;

Figure 2 is a top plan view of the cooker; and

Figure 3 is a side elevation thereof.

A steam chest or cooker 1 has a top 2, bottom 3, and sides 4 and 5. The sides 4 and 5 do not extend all the way to the bottom 3, for reasons which will appear later. Extending from either side of the bottom 3 are the parts 6 and 7 of the chest. These parts need not extend to the full height of the chest. Between the side 4 and the part 6 is a conveyor entrance or water leg 8, and between the side 5 and the part 7 is a conveyor exit or water leg 9. Partitions 10 and 11 are spaced away from the sides 4 and 5 respectively, resulting in an entrance 12 and an exit 13.

The chest may have a safety valve 14, a thermometer 15, and a pressure gauge 16.

The chest may be heated by any suitable means, such as electric heating units, steam coils, or a steam pipe. As shown, a steam pipe 17 is used to convey steam to the chest. This pipe has openings 18 throughout its length within the chest. Liquid is brought into the exit by means of a pipe 19 connected to the ordinary city water system having the usual pressure, or having connected thereto a conventional force pump, not shown and conveyed from the top of the exit to the bottom of the entrance by a pipe 20. The overflow of the entrance is carried away by a pipe 21.

The steam chest may be raised from the surface by a suitable foundation 22, built to accommodate an endless conveyor 23 passing over wheels 24 and having pivotally attached thereto, at proper distances, crates 25 to hold the receptacles in which the food is placed to be cooked.

Motion is imparted to the conveyor by any suitable power, not shown, through a pulley 26 geared to a wheel 27 attached to the shaft 28 on which one set of wheels 24 is fastened.

The operation of my apparatus will be readily understood from the foregoing description. It may be stated that steam and water are both admitted to place the apparatus in operative condition. The height of the water legs will depend on the steam pressure. I have found by experiment that if the temperature in the chest is 220° Fahrenheit, a pressure of approximately two pounds or a water leg of about four feet is required; if the temperature is 230° Fahrenheit, a pressure of approximately five and one-half pounds or a water leg of about twelve feet is required; and if a temperature of 245° Fahrenheit is used, the pressure required is approximately ten pounds or a water leg of about twenty-two feet. I may use, instead of water, sodium chloride in water, calcium chloride in water, or other suitable solutions of different densities. The pressure and the necessary length of the water leg will therefore depend upon the specific gravity of the liquid.

The crates may be filled with the food in cans or other receptacles either manually or automatically, and the food may likewise be removed from the crates.

The speed of travel of the conveyor will depend upon the size of the chest and the length of time the particular food passing through it must be cooked. The travel may be timed so that the food will reach the exit just as the cooking is completed.

I claim:

1. A continuous pressure cooker comprising a steam chest, a conveyor entrance between said chest and the atmosphere, a conveyor exit between said chest and the atmosphere, liquid in said entrance and said exit, a connection between the upper part of said exit and the lower part of said entrance adapted to convey liquid, and a conveyor adapted to travel constantly through said chest.

2. A continuous pressure cooker comprising a steam chest, a conveyor entrance between said steam chest and the atmosphere, a conveyor exit between said steam chest and the atmosphere, means to admit liquid to the lower part of said exit, means to convey liquid from the upper part of said exit to the lower part of said entrance, and a conveyor adapted to travel through said steam chest.

3. A continuous pressure cooker, comprising a steam chest, a conveyor entrance between said chest and the atmosphere, a conveyor exit between said chest and the atmosphere, liquid in said entrance and in said exit, said entrance and said exit constituting liquid legs of sufficient height to form pressure seals to balance the pressure in the steam chest, a connection between the upper part of said exit and the lower part of said entrance to convey liquid from the top of the exit to the bottom of the entrance, a conveyor adapted to travel through said entrance, said chest and said exit, whereby the food passing through said cooker may be warmed by the liquid in the entrance, cooked in the chest and cooled in the exit.

4. A pressure cooker comprising a steam chest, a conveyor entrance to said chest, a conveyor exit from said chest, a conveyor adapted to travel through said entrance, said chest and said exit, liquid in said entrance to prevent the escape of steam from said steam chest, liquid in said exit to prevent the escape of steam from said steam chest, the quantity of liquid necessary in said entrance and said exit to prevent the escape of steam from said chest depending upon the steam pressure in said chest and the specific gravity of said liquid, means to force liquid into the exit, means to carry away the overflow of liquid from the entrance, and a connection between the exit and the entrance independent of the steam chest.

In testimony whereof I affix my signature.

ROBERT L. HUNTER.